United States Patent [19]
Watanabe et al.

[11] Patent Number: 5,865,966
[45] Date of Patent: Feb. 2, 1999

[54] NON-MEMBRANE ELECTROLYTIC CELL FOR ELECTROLYSIS OF WATER

[75] Inventors: Kazuyuki Watanabe; Hiroshi Takamatsu; Hidetaka Miyahara; Shigeru Ando; Tomohiro Nishi, all of Kita-kyushu, Japan

[73] Assignee: Toto Ltd., Fukuoka, Japan

[21] Appl. No.: 765,578

[22] PCT Filed: Jun. 30, 1995

[86] PCT No.: PCT/JP95/01311

§ 371 Date: Dec. 27, 1996

§ 102(e) Date: Dec. 27, 1996

[87] PCT Pub. No.: WO96/00701

PCT Pub. Date: Jan. 11, 1996

[30] Foreign Application Priority Data

Jun. 30, 1994 [JP] Japan .................................. 6-172070
Jun. 30, 1994 [JP] Japan .................................. 6-172071

[51] Int. Cl.⁶ .................................................. C25B 9/00
[52] U.S. Cl. ............................................ 204/275; 204/279
[58] Field of Search ........................... 204/263, 275–278, 204/279

[56] References Cited

U.S. PATENT DOCUMENTS 4,194,961  3/1980  Williams ........................... 204/275 X
4,323,444  4/1982  Kawamura et al. .
5,041,202  8/1991  Friconneau et al. .................. 204/275
5,254,234 10/1993  Cortes et al. ........................ 204/275

FOREIGN PATENT DOCUMENTS

| 0627386 | 12/1994 | European Pat. Off. . |
| 2538000 | 4/1976 | Germany . |
| 51-77584 | 7/1976 | Japan . |
| 55-91996 | 6/1980 | Japan . |
| 59-189871 | 12/1984 | Japan . |
| 1-203097 | 8/1989 | Japan . |
| 2-9874 | 3/1990 | Japan . |
| 4-284889 | 10/1992 | Japan . |
| 5-245473 | 9/1993 | Japan . |
| 6-339690 | 12/1994 | Japan . |

*Primary Examiner*—Donald R. Valentine
*Attorney, Agent, or Firm*—Finnegan, Henderson, Farabow, Garrett & Dunner, L.L.P.

[57] ABSTRACT

A non-membrane type electrolytic cell (10) comprises an anode plate (16, 20) and a cathode plate (18) which are arranged opposite to each other with an electrically insulating spacer (22) sandwiched therebetween. The spacer (22) is formed of plastics having a water absorption of not more than 0.3%, preferably not more than 0.2%, more preferably not more than 0.01%. Deposition of scale, such as calcium carbonate, on the spacer (22) is prevented.

4 Claims, 12 Drawing Sheets

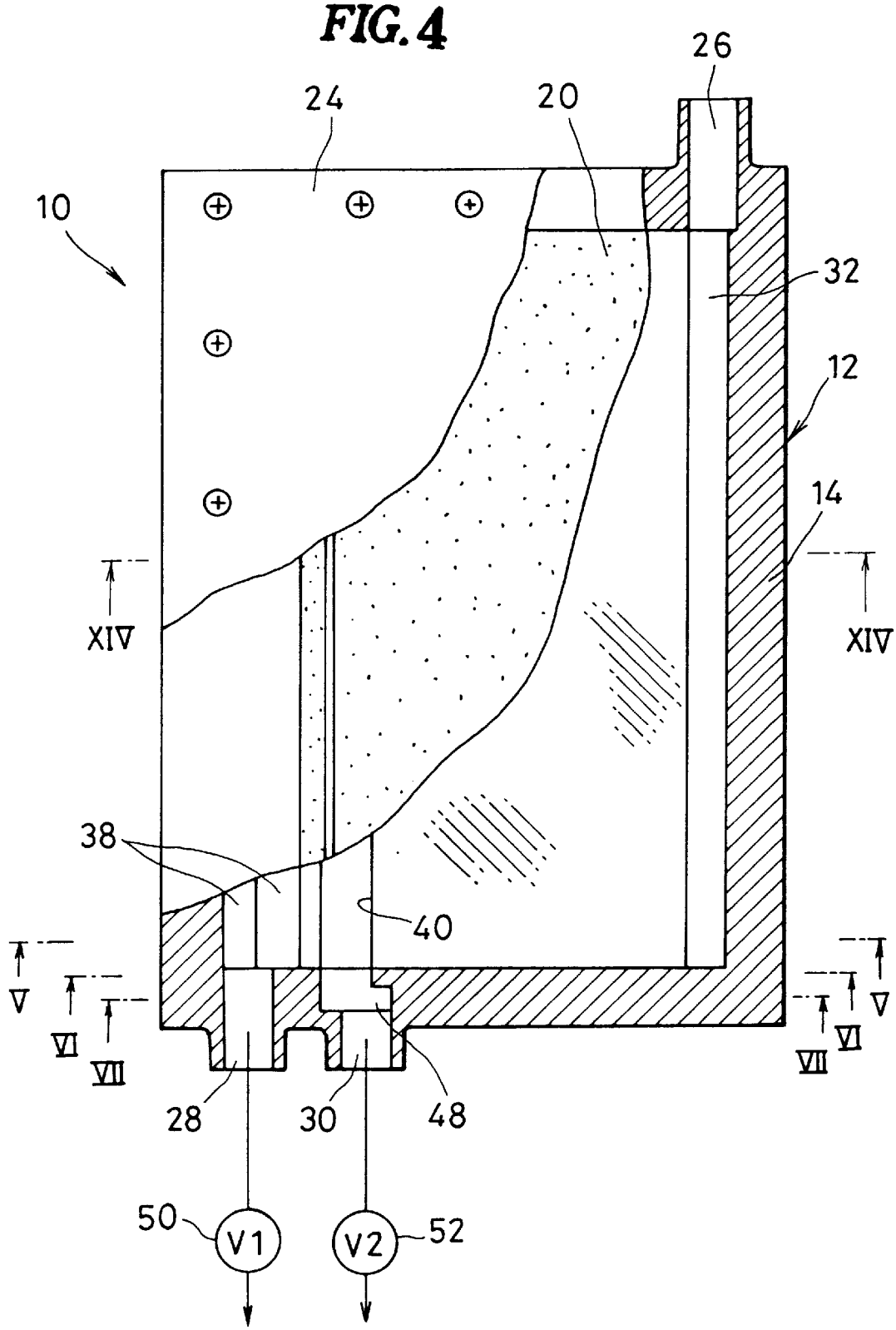

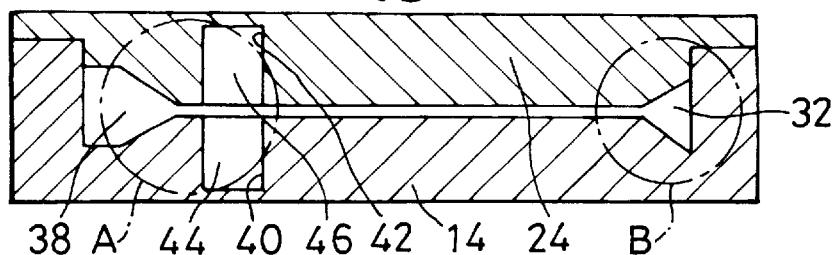
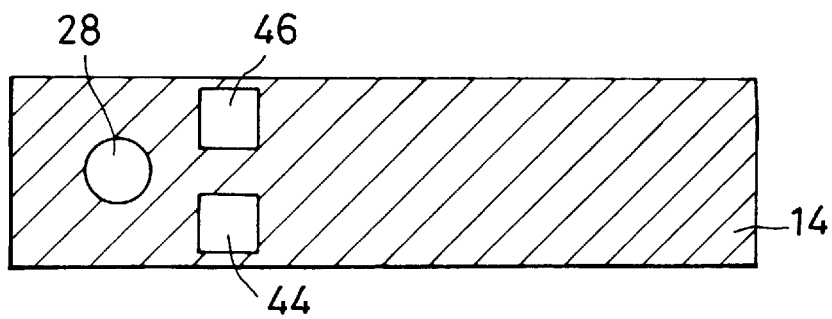
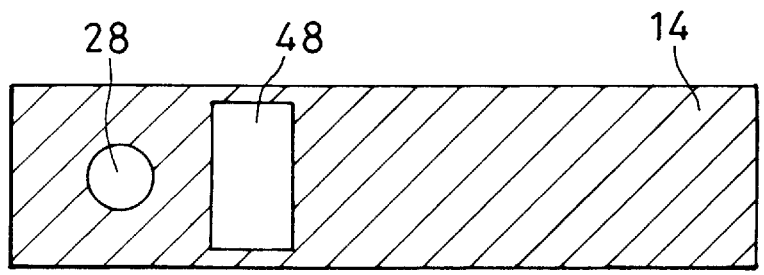
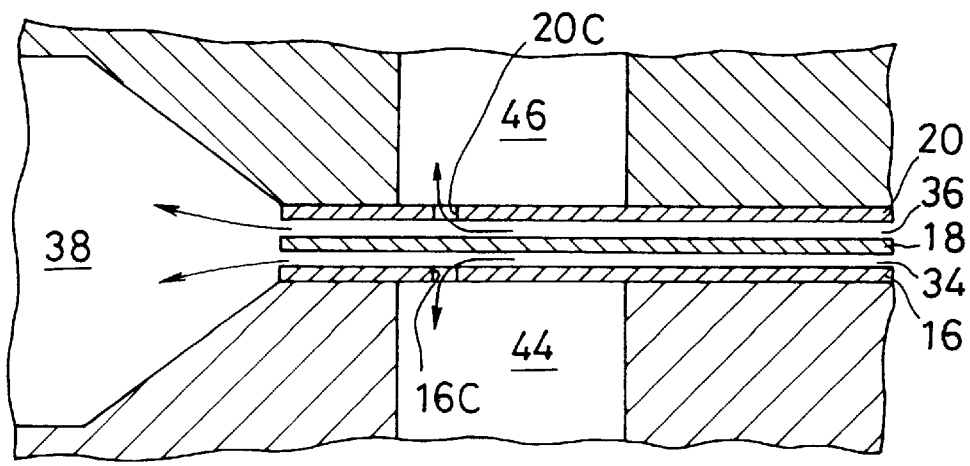

NON-MEMBRANE ELECTROLYTIC CELL FOR ELECTROLYSIS OF WATER

This is a National Stage Application of PCT/JP95/01311, filed Jun. 30, 1995.

TECHNICAL FIELD

The present invention relates to an electrolytic cell for electrolyzing water to electrochemically produce alkaline and/or acidic water. More specifically, the present invention is concerned with a non-membrane type electrolytic cell which is capable of effectively preventing scale such as calcium carbonate from precipitating in the water path.

BACKGROUND ART

It is believed that hydroxyl ion ($OH^-$) enriched alkaline water, which is often incorrectly referred-to as "alkaline ion water", is useful in health maintenance when served as potable water as well as in accentuating taste when used in cooking or for the preparation of beverages such as tea and coffee. Similarly, hydrogen ion ($H^+$) enriched acidic water is known as being suitable for boiling noodles and washing the face. More importantly, highly acidic water which is obtained by electrolysis of tap water containing sodium chloride or an aqueous solution of sodium chloride and which therefore contains effective chlorine (hypochlorous acid or chlorine gas) has been noted as having a strong germicidal effect.

To produce alkaline and/or acidic water, an apparatus for electrolyzing water has been used hitherto which is often incorrectly referred-to in the art as an "ion-water generator". This apparatus, designed to subject water to electrolysis, includes an electrolytic cell having an anode and a cathode. As a direct electric potential is applied between the electrodes, the hydroxyl ions $OH^-$ being present in water due to electrolytic dissociation of water molecules will donate electrons to the anode at the anode-water interface and are thereby oxidized to form oxygen gas which is then removed away from the system. As a result, the $H^+$ concentration is enhanced at the anode-water interface so that $H^+$ enriched acidic water results at the anode-water interface. At the cathode-water interface, on the other hand, $H^+$ accepts electrons from the cathode and is reduced to hydrogen to form hydrogen gas which is similarly eliminated from the system. As a result, the $OH^-$ concentration is increased whereby $OH^-$ enriched alkaline water is generated on the cathode side. When an aqueous solution of sodium chloride is subjected to electrolysis, chlorine gas is generated at the anode and is dissolved into water to form hypochlorous acid.

To preclude alkaline water and acidic water once generated by electrolysis from being mixed with each other and to remove them separately, the conventional electrolytic cells are typically provided with a water-impermeable, electrically conducting but ion-permeable membrane 3 arranged between an anode plate 1 and a cathode plate 2 as schematically shown in FIG. 1, the electrolytic chamber being divided by the membrane into a flowpath 4 for alkaline water and a flowpath 5 for acidic water. The electrolytic cell of this type will be referred-to hereinafter as the "membrane-type" electrolytic cell.

As the electrolytic cell is operated, precipitation of scale 6 comprised of calcium carbonate, calcium hydroxide, magnesium hydroxide and the like takes place in the flowpath for alkaline water. Referring to FIG. 2 wherein the apparent solubility of calcium carbonate versus pH is shown, the mechanism of scale precipitation will be described with reference to calcium hydroxide by way of an example. It will be noted from the graph that under acidic conditions, calcium carbonate is dissolved into water in the form of calcium ions. However, as the pH exceeds 8, the solubility rapidly drops so that calcium carbonate settles in the flowpath for alkaline water. The calcium ions are moved toward the cathode plate under the action of the electric field between the electrodes whereby the calcium ion concentration in the flowpath for alkaline water is increased. This in turn promotes precipitation of calcium carbonate.

In the electrolytic cell of the membrane type, the scale tends to precipitate predominantly on the membrane 3 rather than on the cathode 2, as shown in FIG. 1. Probably, this is because the porous nature of the membrane promotes precipitation of the scale, in contrast to the cathode generally having a polished specular surface. Since the precipitates such as calcium carbonate are electrically insulating, the electrical resistance across the cell is increased thereby lowering the efficiency of electrolysis of the cell. In addition, formation of scale increases the flow resistance across the electrolytic cell. Therefore, unless the scale is removed, the electrolytic cell would become inoperative soon after a short period of use.

Accordingly, there has been proposed in the prior art to remove the precipitates by dissolving them into water as disclosed, for example, in Japanese Patent Kokai Publication 51-77584, Japanese Utility Model Kokai Publication 55-91996, Japanese Utility Model Kokai Publication 59-189871, and Japanese Patent Kokai Publication 1-203097. According to this method, a polarity reversal switch 7 (FIG. 1) is turned over in such a manner that an electric potential of an polarity opposite to the normal operating polarity is applied between the electrodes to thereby cause the precipitates to dissolve. This method is known in the art as "reverse electrolysis descaling" or "reverse potential descaling" process. The principle of reverse electrolysis descaling is that, upon application of electric potential of the opposite polarity, the flowpath for the alkaline water is changed into acidic conditions whereby the scale such as calcium carbonate is disintegrated into ions to again dissolve into water as will be understood from FIG. 2.

However, since the membrane 3 is more or less spaced from the electrodes as will be understood from FIG. 1, the stream of strongly acidic water which has been generated along the surface of the electrode 2 (originally acting as the cathode, but now acting as the anode because the polarity of potential is reversed) will be carried away by the flow of water flowing through the flowpath so that strongly acidic water could not reach the membrane as long as it is present in moving water. Therefore, the membrane cannot be rendered acidic to a degree strong enough to quickly dissolve the scale deposited on the membrane. Moreover, where the application of reverse voltage is carried out while flow of water is stopped, the hydrogen ions generated at the surface of the initial cathode 2 (now anode because the potential is reversed) will permeate through the membrane 3 and will be diffused toward the opposite flowpath so that acid water and alkaline water once generated are mixed with each other and are neutralized. As a result, the membrane cannot be rendered strongly acidic. According to the experiment carried out by the present inventors, the pH of the flowpath 4 originally for alkaline water did not become less than 3 when the reversed polarity potential was applied. No removal of scale was observed even after about two days of application of the reversed polarity potential.

In this manner, in the "membrane-type" electrolytic cell, it has been difficult to electrochemically remove the scale even though the so-called reverse electrolysis descaling is carried out. Accordingly, it has been usual that the life of the electrolytic cells is only from a half to one year unless the cells are periodically disassembled and are subjected to manual mechanical descaling operations. Furthermore, the membrane is unhygienic since it serves as breeding bed for bacteria. In addition, the space between the electrode plates must be set large enough to ensure that the membrane is installed therebetween. This leads to the disadvantage that the power consumption of the electrolytic cell becomes large.

In order to overcome the foregoing disadvantages of the membrane-type electrolytic cell, proposed in Japanese Patent Kokai Publication 4-284889 is an electrolytic cell which is free from a membrane. The electrolytic cell of this type will be referred-to hereinafter as the "non-membrane" or "membraneless" type electrolytic cell. In the non-membrane type cell, the electrode plates are spaced from one another with a small gap in such a manner that a laminar flow is established as water flows between the electrodes. Therefore, alkaline water and acidic water as generated can be separated from each other without recourse to a membrane.

As the membraneless-type electrolytic cell is not provided with a membrane which is susceptible to deposition of scale, there is an advantage that less scale is deposited. Moreover, the cell is hygienic because of the absence of a membrane which would otherwise breed bacteria. Furthermore, it is possible to reduce the electrode spacing to thereby reduce the power consumption of the electrolytic cell. The non-membrane type electrolytic cell is also designed such that the reverse polarity potential is applied to carry out the so-called reverse electrolysis descaling in a manner similar to the conventional membrane-type electrolytic cells. Accordingly, it is possible to remove substantially all of the scale that has precipitated on the surface of the cathode plate.

In the non-membrane type electrolytic cell disclosed in JP 4-284889, it is desirable to arrange the cathode and anode with as small spacing as possible with one another to ensure that the electric power consumption is reduced as well as to ensure that a laminar flow is readily established in the flow of water flowing in the flowpath defined between the cathode and anode. In that event, it is then preferable to sandwich between the cathode and anode one or more electrically insulating spacers of a predetermined thickness to ensure that, even if the electrodes undergo a certain degree of distortion or strain, the electrode spacing is kept constant throughout the flowpath to thereby prevent the electrolyzing performance from fluctuating from cell to cell.

However, in the case where the spacers are placed in this manner between the electrodes, the scale tends to precipitate on the lateral surface of respective spacers so that the flowpath of water will be gradually clogged with the scale, as described later with reference to the accompanying drawings. It is believed that this is due to the fact that the scale readily precipitates on the lateral surface of the spacers since the velocity of water flowing along the boundary between the spacers and water is so slow. The scale that has precipitated on the lateral surface of the spacers could not be readily removed by the application of the reverse polarity potential (i.e., the so-called reverse electrolysis descaling process). Once precipitated, the scale gives rise to the formation of turbulent flow so that the flow of water becomes even slower whereby precipitation of the scale is further promoted.

An object of the invention is to improve the non-membrane type electrolytic cell disclosed in JP 4-284889 and to provide a non-membrane type electrolytic cell that is capable of effectively preventing the accumulation of scale caused by the spacers.

In the non-membrane type electrolytic cell, there exists, in the inlet area of the flowpath defined between the cathode and anode, a turbulent flow region wherein a stable laminar flow is not established as yet. In this turbulent flow region, it is not possible to produce highly acidic water along the surface of the electrode plates. Therefore, it is difficult to effectively dissolve the scale into water even if a reverse polarity potential is applied periodically.

Accordingly, another object of the invention is to provide a non-membrane type electrolytic cell which is capable of effectively preventing the accumulation of scale throughout substantially the entire length of the electrodes.

DISCLOSURE OF THE INVENTION

The present inventors have discovered that the tendency of the scale to precipitate onto the surface of the spacers is related to the water absorption rate of the material forming the spacers. Water absorption rate is a quantitative expression of the capability of an object to absorb water and may be defined as the ratio, in percentage, of the increased weight of an object, after it has been soaked in distilled water at a predetermined temperature and for a predetermined time, with respect to the initial weight of the object. The present invention is based on the finding that, the smaller the water absorption rate of the material forming the spacers is, the more difficult it becomes for the scale to precipitate out. According to the present invention, the non-membrane type electrolytic cell having an anode and a cathode arranged opposite to each other with an electrically insulating spacer sandwiched therebetween is characterized in that the spacer is formed of an electrically insulating material having a water absorption rate equal to or less than 0.3%, preferably 0.2%, more preferably 0.01%. The spacer may be made, for example, from a material such as polytetrafluoroethylene or polypropylene.

Although the reason that the water absorption rate of the material forming the spacer affects the tendency of scale precipitation is not clear, it is believed that, when the spacer is formed from a material having a large water absorption rate, many open pores will exist on the surface of the spacer so that a flow of water will be trapped within these open pores to lose its velocity to thereby promote the formation of nuclei of precipitate. By making the spacer from a material having a water absorption rate specified above, it is possible to prevent for a long time the scale of calcium carbonate or the like from precipitating out onto the spacer so that the life of the electrolytic cell is greatly increased.

In a preferred embodiment of the invention, the inlet of the flowpath of the electrolytic cell is connected to a water distribution path having a cross-sectional flow area larger than that of the flowpath, the cross-section of the distribution path being designed and configured in such a manner that the turbulent flow region occurring at the inlet region of the flowpath is minimized.

BRIEF DESCRIPTION OF THE DRAWINGS

FIG. 4 is a cross-sectional view taken along the line IV—IV of FIG. 3 and showing the electrolytic cell as assembled;

FIG. 5 is a cross-sectional view taken along the line V—V of FIG. 4, with electrodes and spacers being omitted for simplicity;

FIG. 6 is a cross-sectional view taken along the line VI—VI of FIG. 4;

FIG. 7 is a cross-sectional view taken along the line VII—VII of FIG. 4;

FIG. 8 is an enlarged view of the encircled part A of FIG. 5;

BEST MODE FOR CARRYING OUT THE INVENTION

Figure 1:
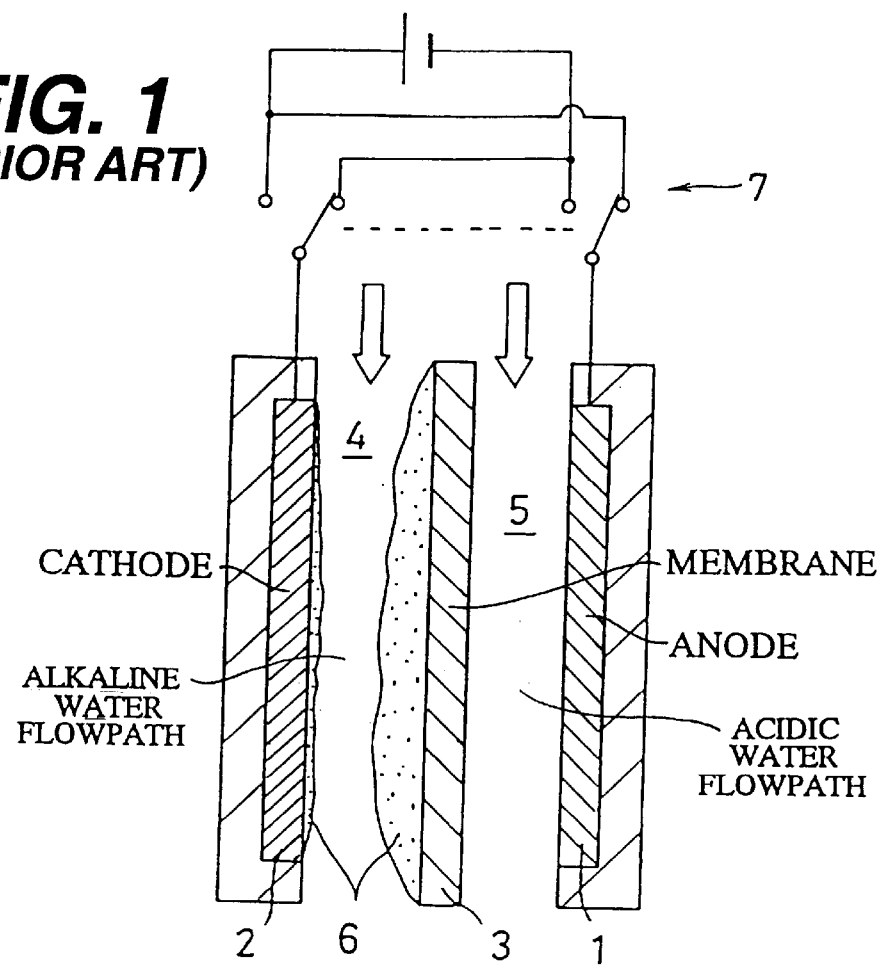
FIG. 1 is a schematic cross-sectional representation of the conventional membrane-type electrolytic cell.
Figure 2:
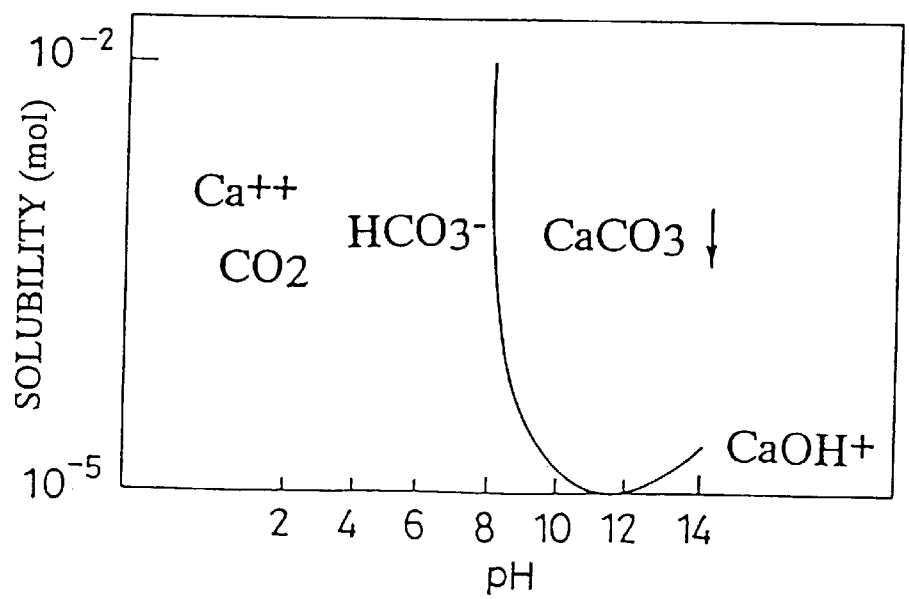
FIG. 2 is a graph showing the apparent solubility of calcium carbonate versus pH.
Figure 3:
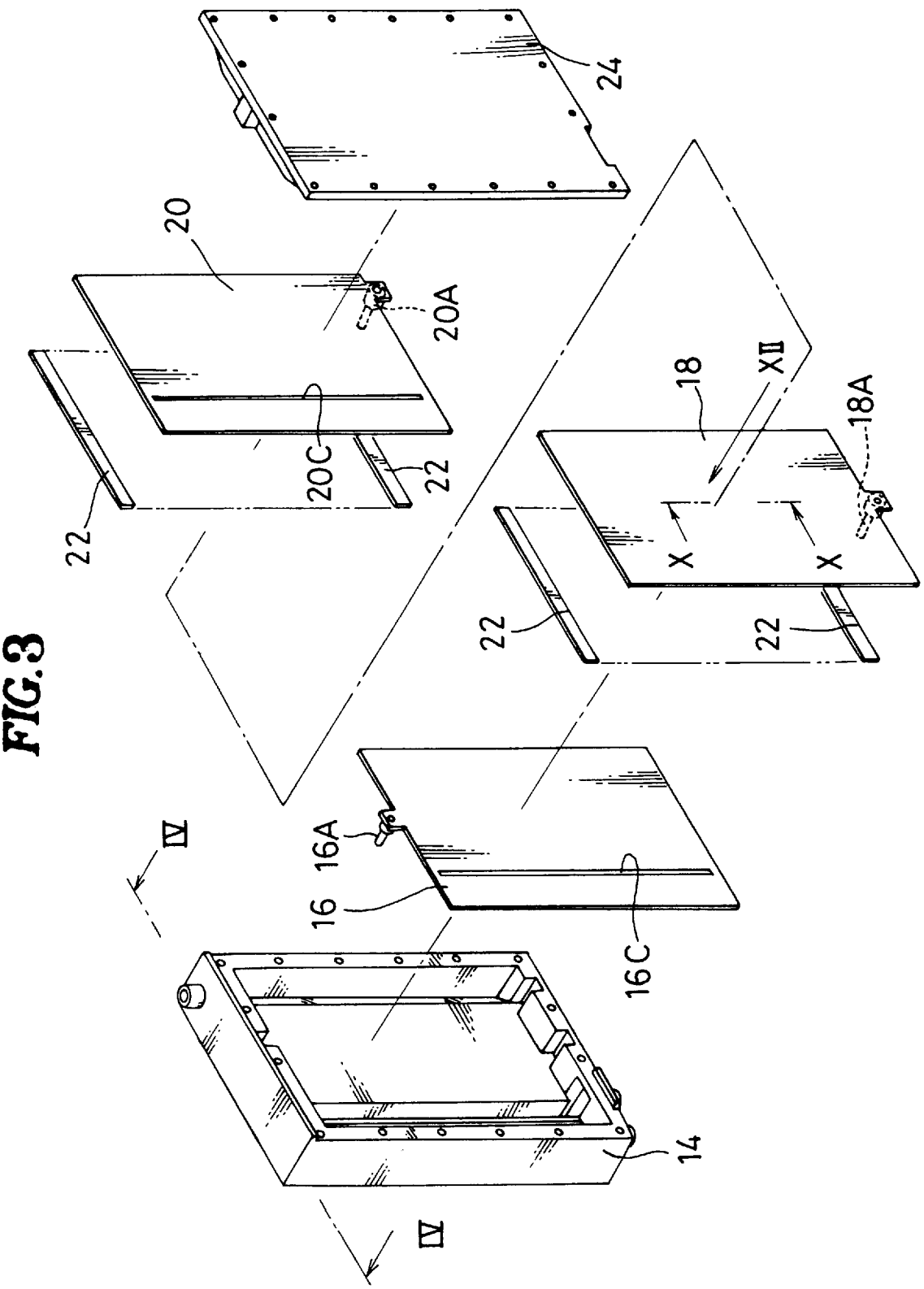
FIG. 3 is an exploded perspective view of the electrolytic cell of this invention.

In FIGS. 3–9, there is shown an electrolytic cell embodying the present invention. Referring primarily to FIGS. 3 and 4, the electrolytic cell 10 of the non-membrane type has a vertically elongated housing 12. The housing 12 comprises three electrode plates including a first anode 16 and a cathode 18, and a second anode 20 and is assembled by placing these electrodes in sequence within a recess of a pressure-resistive casing 14 made of rigid plastics, with a plurality of plastic spacers 22 sandwiched therebetween, followed by fluid tightly fastening a cover 24 by screws to the casing 14. By arranging the anode plates 16 and 20 on both sides of the cathode plate 18, the electrolytic cell 10 is made in a double cell structure so that the both sides of the cathode plate 18 is effectively utilized to double the electrolyzing capacity of the cell yet facilitating to store the cell in a small space.

The spacing between the electrode plates is dictated by spacers 22, numbering five, for example. In the embodiment shown, the spacers 22 have a thickness of about 0.5 mm so that the electrode spacing is equal to about 0.5 mm. The spacers 22 may be formed from a plastic material, such as polytetrafluoroethylene and polypropylene, that has a low water absorption rate.

Preferably, the electrode plates 16, 18 and 20 are made of titanium plate coated with platinum. Terminals 16A, 18A and 20A are attached to the respective electrode plates 16, 18 and 20 to connect them to a DC power source (not shown) via a conventional polarity reversal switch (not shown). As best shown in FIG. 4, the casing 14 is provided with an inlet 26 for tap water, an outlet 28 for alkaline water and an outlet 30 for acidic water. The inlet 26 is in communication with a water distribution passage 32 of a generally triangular cross-section. As best shown in FIG. 5, the water distribution passage 32 is defined by the casing 14 and the cover 24 and extends throughout the entire vertical length of the electrodes. When operating the electrolytic cell 10, the water inlet 26 may be connected to a tap-water line with a hose or the like. Alternatively, the electrolytic cell 10 may be connected downstream of a water purifier so that water purified by the water purifier is fed to the water inlet 26 of the electrolytic cell 10.

Figure 9:
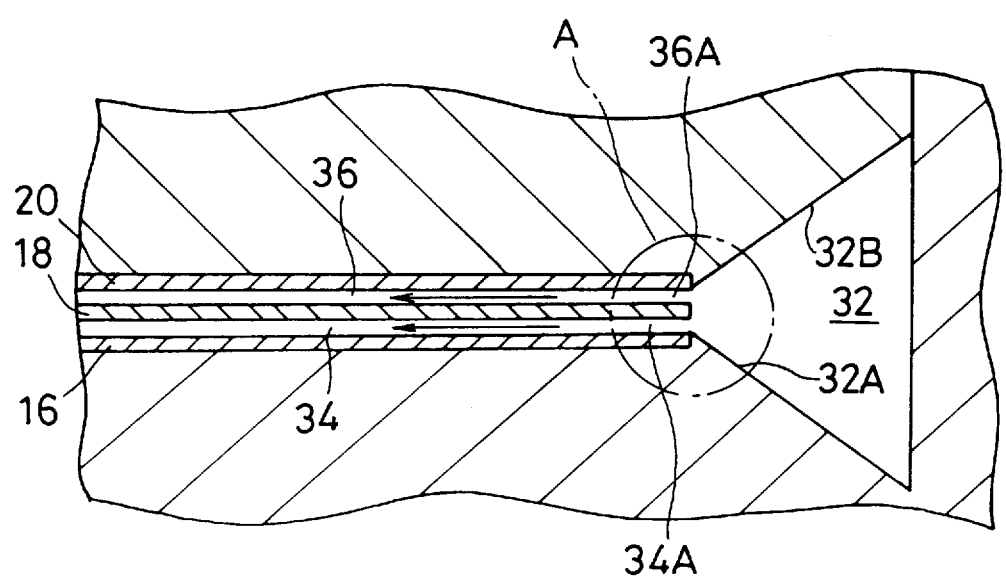
FIG. 9 is an enlarged view of the encircled part B of FIG. 5.

As shown enlarged in FIGS. 8 and 9, a first flowpath 34 is formed between the first anode plate 16 and cathode plate 18, and a second flowpath 36 is formed between the cathode plate 18 and the second anode plate 20. These flowpaths 34 and 36 cooperate with the electrode plates 16, 18 and 20 to form a pair of electrolytic chambers. Each of the flowpaths 34 and 36 are divided, for example, by horizontally extending five spacers 22 into vertically arranged four subflowpaths.

As shown in FIG. 9, the inlets 34A and 36A of these flowpaths 34 and 36 are in communication with the water distribution passage 32 having a cross-sectional flow area larger than that of the flowpaths. Accordingly, supply water incoming from the inlet 26 and flowing down along the distribution path 32 will be distributed over the four subflowpaths of respective flowpaths 34 and 36 to thereby flow therein in the horizontal direction as shown by the arrow in FIG. 9.

Figure 14:
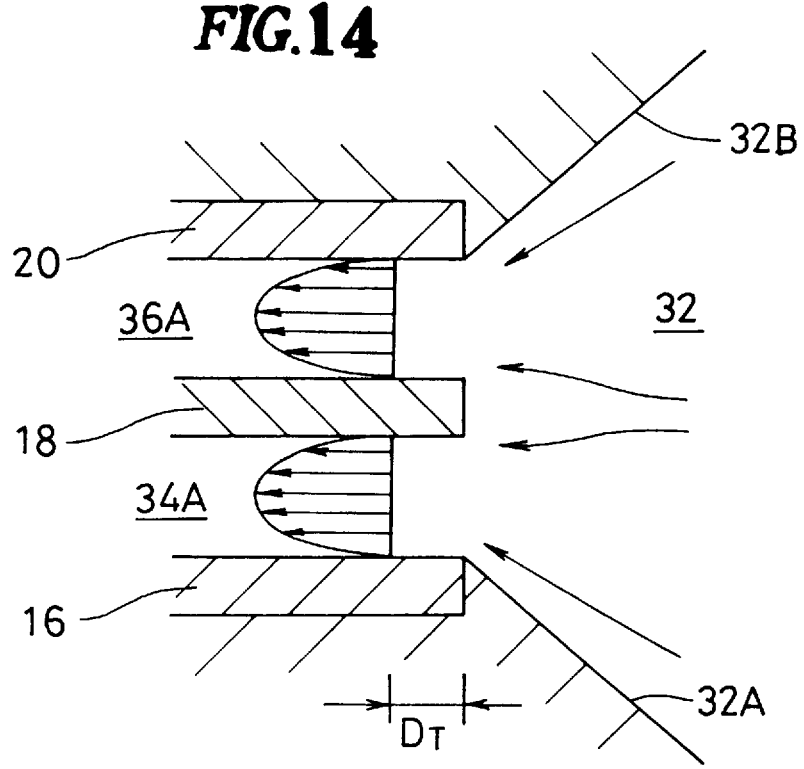
FIG. 14 is an enlarged schematic view of the encircled part A of FIG. 9.

As shown in FIGS. 9 and 14, the side walls 32A and 32B of the distribution path 32 are inclined toward the inlets 34A and 35A of the flowpaths so that water flows smoothly from the distribution path 32 into the inlets 34A and 36A of the flowpaths. With this arrangement, the flow of water flowing into the flowpath inlets 34A and 36A will become a laminar flow as it is flows through a relatively short inlet run, Dt, as shown in FIG. 14.

As shown in FIGS. 5 and 8, the downstream ends of the flowpaths 34 and 36 acting as the electrolytic chambers are open to an alkaline water recovery passage 38 which is defined by the casing 14 and the cover 24 and which has a roughly pentagonal cross-section. The recovery passage 38 for alkaline water is communicated with the outlet 28 for the alkaline water and extends throughout the entire vertical length of the electrodes in a manner similar to the water distribution path 32. As best shown in FIGS. 5 and 8, the cross-sectional flow area of the alkaline-water recovery passage 38 is also made sufficiently large as compared with that of the flowpaths 34 and 36, to ensure that the flow of alkaline water flows smoothly from the ends of the flowpaths 34 and 36 into the alkaline water recovery passage 38, without involving formation of the turbulence.

As shown in FIG. 5, the casing 14 and the cover 24 are further provided with grooves 40 and 42 which extend throughout the entire vertical length of the anode plates 16 and 20, the grooves cooperating with the anode plates to form recovery passages 44 and 46 for acidic water, respectively. The lower ends of the acidic water recovery passages 44 and 46 are merged with a connection port 48 (FIGS. 6 and 7) and are communicated further with the outlet 30 (FIG. 4) for acidic water.

As shown in FIGS. 3 and 8, in the illustrated embodiment, the anodes 16 and 20 are formed, respectively, with slits 16C and 20 which act as recovery openings for acidic water to ensure that water passing through these slits 16C and 20C flows into the recovery passages 44 and 46 for acidic water. The volumetric capacity of the recovery passages 44 and 46 for acidic water is made sufficiently large with respect to the cross-sectional flow area of the slits 16C and 20C such that the flow of acidic water recovered through the slits is caused to flow smoothly into the recovery passages 44 and 46 for acidic water without causing formation of turbulent flow. The flow of acidic water flowing out of the slits 16C and 20C is recovered in the acidic water recovery passages 44 and 46 for substantially the entire vertical length of the anode plates and is forwarded therefrom further to the outlet 30 for acidic water.

To produce alkaline or acidic water by using the electrolytic cell 10, the supply water inlet 26 of the cell may be connected to a tap-water faucet through a hose or the like, with conventional flow control valves 50 and 52 connected, respectively, to the outlet 28 for alkaline water and outlet 30 for acidic water. Tap water supplied to the water inlet 26 will be uniformly distributed by the distribution path 32 over the inlets (upstream end) of the flowpaths 34 and 36 throughout the entire vertical length of the electrodes 16, 18 and 20 so that water will flow in the horizontal direction into the flowpaths 34 and 36, as described before.

While feeding water through the flowpaths 34 and 36, a DC voltage of about 12 V, for example, is applied between the cathode 18 and anodes 16 and 20 to subject flowing water to electrolysis whereupon alkaline water is produced along the surface of the cathode plate 18, with acidic water being produced along the surfaces of the anode plates 16 and 20. The alkaline water is recovered through the outlet 28 of the electrolytic cell and the acidic water is recovered through the outlet 30.

As alkaline water is generated, flocculent deposits such as calcium carbonate will precipitate on both surfaces of the cathode plate 18. However, the flocculent precipitate deposited on the surfaces of the cathode 18 may be removed relatively quickly upon turning over the polarity reversal switch at a proper timing. When a positive potential is applied to the cathode plate 18 and a negative potential is applied to the anode plates 16 and 20, a layer of strongly acidic water will be formed along the surface of the cathode 18. The layer of highly acidic water serves to dissolve the deposit which has precipitated out on the surface of the cathode plate 18.

Figure 10:
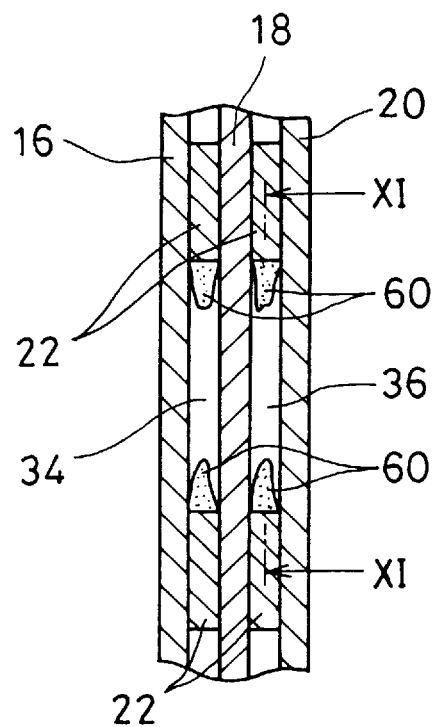
FIG. 10 is a cross-sectional view taken along the line X—X of FIG. 3 and showing the electrolytic cell as assembled.
Figure 11:
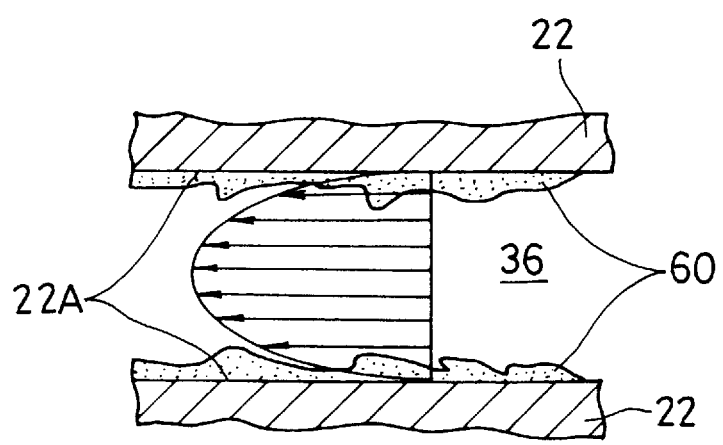
FIG. 11 is a schematic cross-sectional view taken along the line XI—XI of FIG. 10.

As shown in FIG. 11, the velocity of water flow approaches zero at the boundary between the spacers 22 and water. Therefore, if the spacers 22 are formed from a material having a large water absorption, a deposit 60 of calcium carbonate and the like will tend to precipitate out along the lateral surface 22A of the spacers 22, as shown in FIG. 10. However, with the spacers 22 formed from a material having a low water absorption according to the invention, it is possible to prevent the deposit from precipitating out on the lateral surface 22A of the spacers 22.

EXAMPLE 1

An electrolytic cell having a structure as shown in FIGS. 3 and 4 was built and was subjected to an accelerated test using spacers formed from different materials. The spacers were made respectively of five different plastic materials shown below:

| Spacer Material | Water Absorption (%) |
|---|---|
| ABS resin | 0.4 |
| polysulfone | 0.22 |
| polycarbonate | 0.15 |
| polypropylene | <0.01 |
| polytetrafluoroethylene | ≈0.00 |

Tap water of the city of Chigasaki, Japan, was electrolyzed while applying a reverse polarity potential for approximately 15 seconds after every four minutes of water feed. After the accumulative total operating time reached approximately 200 hours (equivalent to about 7 years of home use of the electrolytic cell under the normal condition), the electrolytic cell was disassembled to check the condition of scale deposition on the surface of the cathode plate 18. The condition of scale deposition on the surface of the cathode plate 18 is shown in the photographs of FIGS. 12A through 12C and FIGS. 13A and 13B for each of the spacer materials.

Figure 12A:
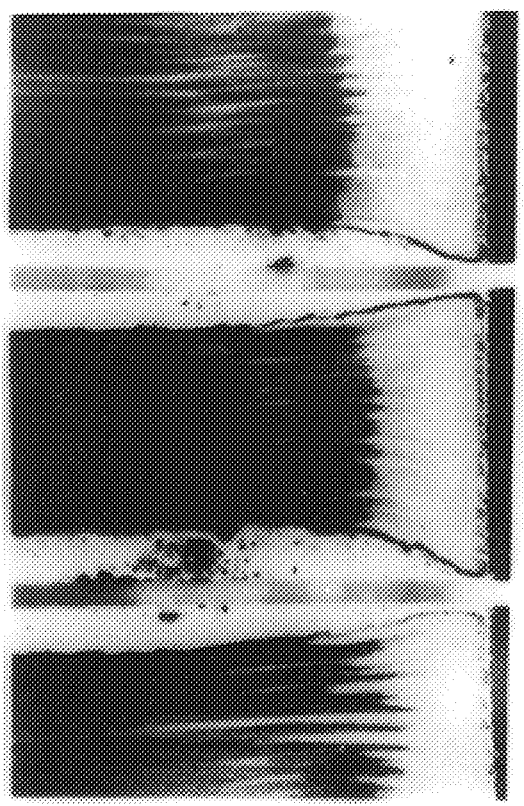
FIG. 12A through FIG. 12C are photographs showing the condition, as seen in the direction of the arrow XII of FIG. 3, of the precipitate deposited on the cathode plate of the electrolytic cell provided with the spacers made of different materials, with FIG. 12A showing the case wherein the spacer is made of ABS resin, with FIG. 12B showing the case wherein the spacer is made of polysulfone, and with FIG. 12C showing the case wherein the spacer is made of polycarbonate.
Figure 12B:
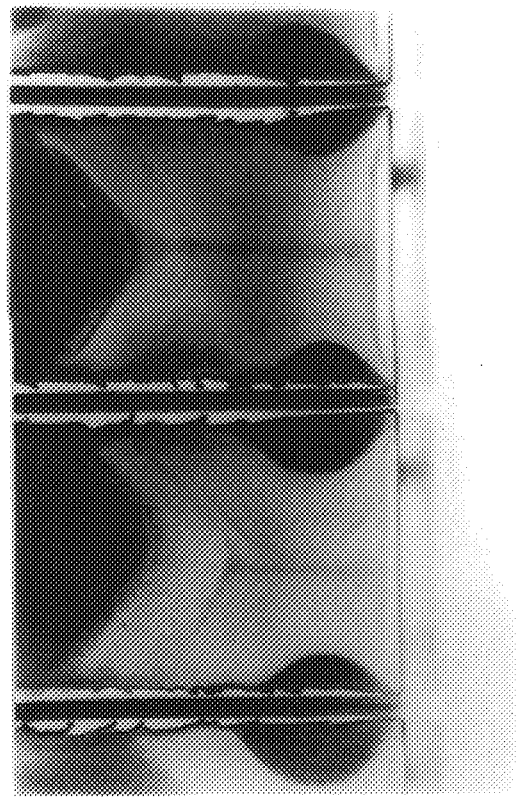
Figure 12C:
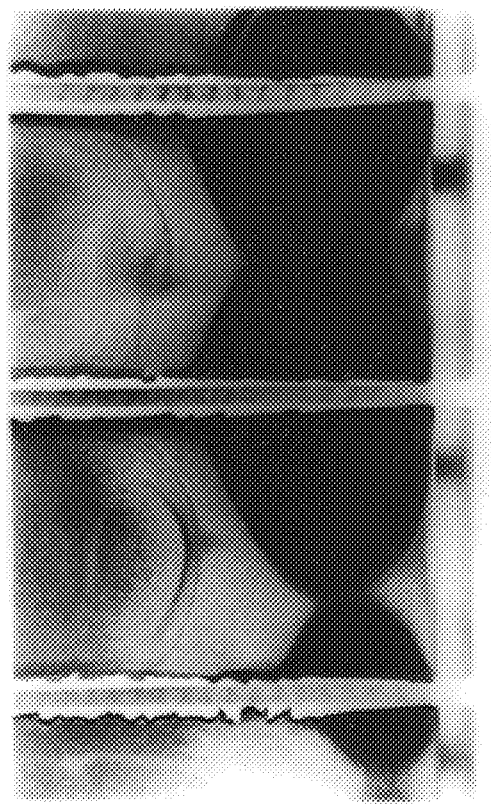
Figure 13A:
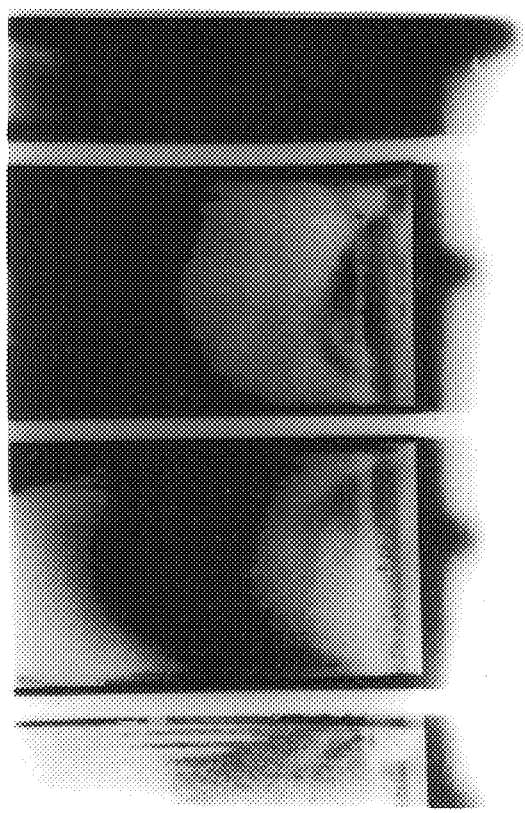
FIG. 13A and FIG. 13B are photographs similar to FIGS. 12 and showing the condition of the precipitate deposited on the cathode plate, with FIG. 13A showing the case wherein the spacer is made of polypropylene, and with FIG. 13B showing the case wherein the spacer is made of polytetrafluoroethylene.
Figure 13B:

FIG. 12A shows the condition of scale deposition with a spacer formed from ABS (acrylonitrile-butadiene-styrene) resin which has a high water absorption rate. It will be noted that after approximately 200 hours of operation, the scale has deposited to an inadmissible degree. FIGS. 12B and 12C show the condition with spacers formed from polysulfone and polycarbonate, respectively, which have smaller water absorption. Although formation of the scale is observed, it is much less in amount than with the spacer formed of ABS resin. FIGS. 13A and 13B show the condition with spacers formed from polypropylene and polytetrafluoroethylene, respectively. It will be noted that even after 200 hours of endurance testing, deposition of scale is not found at all.

EXAMPLE 2

Figure 15:
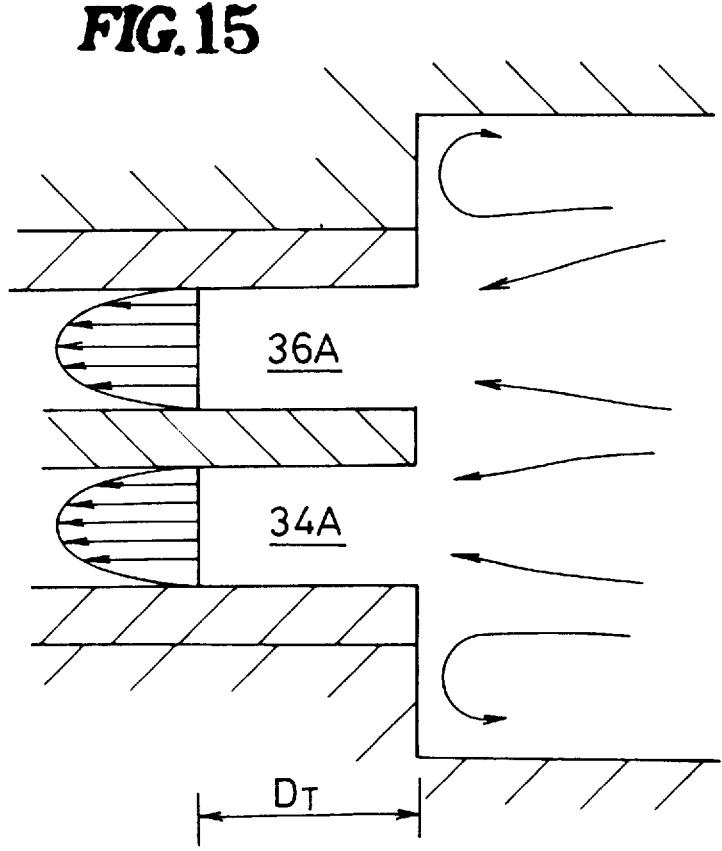
FIG. 15 is a schematic view similar to FIG. 14 and showing an electrolytic cell having the conventional distribution path structure.
Figure 16A:
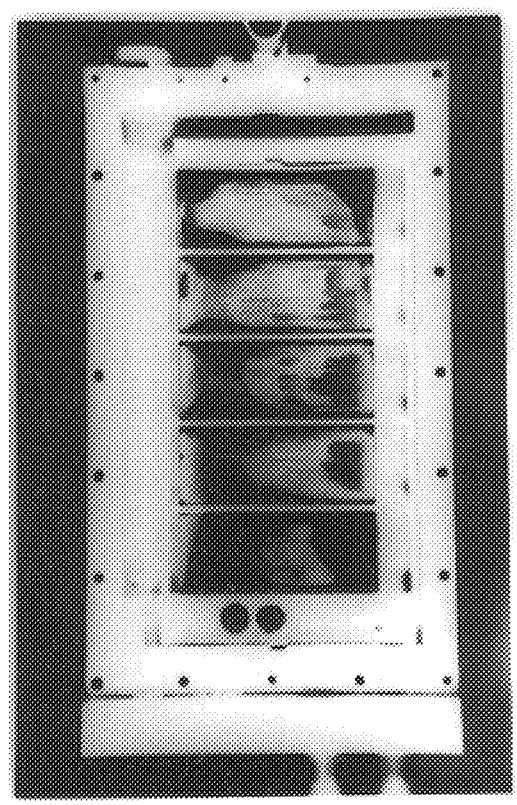
FIG. 16A is a photograph showing the condition of the precipitate deposited on the cathode plate of the electrolytic cell shown in FIG. 14.
Figure 16B:
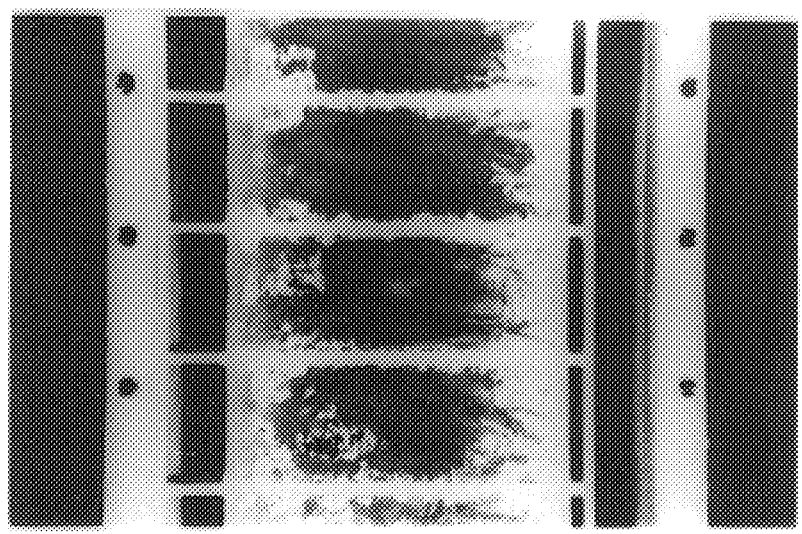
FIG. 16B is a photograph showing the condition of the precipitate deposited on the cathode plate of the electrolytic cell shown in FIG. 15; and, FIG. 17 is a cross-sectional view taken along the line XIV—XIV of FIG. 4 and showing a modified form of the housing of the electrolytic cell, with the electrodes and spacers being omitted.

An electrolytic cell provided with a distribution path having inclined side walls as shown in FIGS. 9 and 14 and another electrolytic cell with a conventional distribution path as shown in FIG. 15 were built. The width of the electrode plates was approximately 5 cm. Tap water of the city of Chigasaki was electrolyzed while applying a reverse polarity potential for approximately 15 seconds after every four minutes of water feed. After the accumulative total operating time reached approximately 200 hours, the respective electrolytic cells were disassembled to check the condition of scale deposition on the surface of the cathode plate 18. The condition of scale deposition on the surface of the cathode plate 18 of the respective cells is shown in FIGS. 16A and 16B. FIG. 16A corresponds to the electrolytic cell shown in FIG. 14, with FIG. 16B corresponding to the conventional electrolytic cell shown in FIG. 15.

As will be understood by comparing FIG. 16A and FIG. 16B, in the case of the conventional electrolytic cell shown in FIG. 15, the scale precipitated for an area of 1 cm as measured from the inlet edge of the flowpath, showing that the precipitate in this inlet area was not dissolved even by the application of the reverse potential. Seemingly, this is because the inlet run, Dt, is so long that turbulent flow occurred for a relatively long distance in the inlet area of the flowpath. In contrast, in the case of the cell structure shown in FIG. 14, no precipitate was found at the inlet of the flowpath even after an operating time equivalent to 7 years of normal use and the precipitate was removed throughout the entire length of the flowpath as shown in FIG. 16A.

Figure 17:
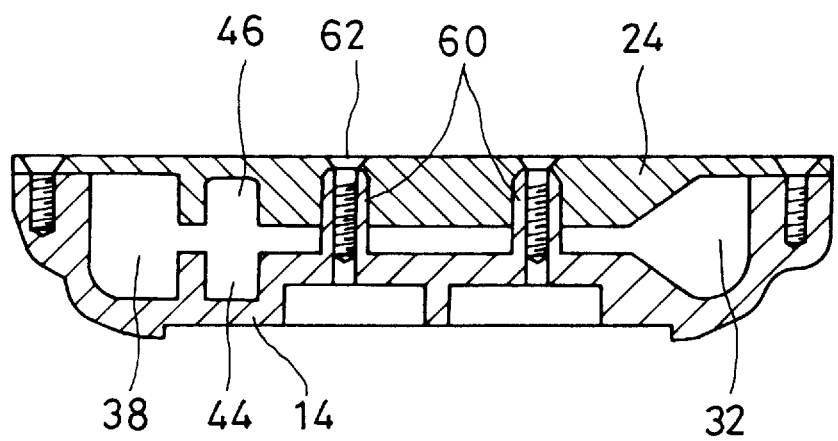

FIG. 17 shows the modified form of the housing 12 of the electrolytic cell. Parts and members similar to those shown in FIGS. 3–5 are indicated by like reference numerals and will not be described again. In this arrangement, the casing 14 has a pair of support columns 60 provided, for example, at the center of the housing 12 as viewed in the vertical direction, the cover 24 being secured by screws 62 to the support columns 60 at its center as viewed in the lateral direction. With this arrangement, it is possible to prevent the casing 14 and cover 24 from swelling or bulging outwardly due to the water pressure whereby the electrode spacing is maintained constant.

While the present invention has been described herein with reference to the specific embodiments thereof, it is contemplated that the invention is not limited thereby. For example, although the electrolytic cell has been described as having a double-cell structure with a central electrode 18 and a pair of lateral electrodes 16 and 20, it is possible to omit one of the lateral electrodes or to further increase the number of the electrodes. Moreover, the spacer 22 may be made of any suitable electrically insulating and heat resistant material and may be coated with a material having a low water absorption. Furthermore, although the central electrode 18 has been described as serving as the cathode while the lateral electrodes 16 and 20 serving as the anode, it is possible to apply the electric potential in such a manner that the central electrode 18 acts as the anode and the lateral electrodes 16 and 20 act as the cathode in order to obtain acidic water at the outlet 28 of the electrolytic cell and alkaline water at outlet 30.

We claim:

1. A non-membrane electrolytic cell wherein an anode plate and a cathode plate forming a pair are arranged opposite to each other with an electrically insulating spacer sandwiched therebetween to form a flowpath serving as an electrolytic chamber and wherein water is subjected to electrolysis as it flows through said flowpath to thereby produce alkaline and/or acidic water, characterized in that said spacer is made of an electrically insulating material having a water absorption equal to or less than about 0.3%, and further wherein said cell comprises a water distribution path connected to an inlet of said flowpath and having a cross-sectional flow area larger than that of said flowpath, and wherein the cross-section of said distribution path is selected such that turbulent flow region formed in the inlet region of flowpath is minimized.

2. A non-membrane electrolytic cell according to claim 1, wherein side walls defining the cross-section of said distribution path is inclined toward the inlet of the flowpath.

3. A non-membrane electrolytic cell comprising an anode plate and a cathode plate arranged opposite to each other and having an electrically insulating spacer sandwiched therebetween to form a flowpath serving as an electrolytic chamber, wherein said electrolytic cell comprises a water distribution path connected to an inlet of said flowpath and having a cross-sectional flow area larger than that of said flowpath, and wherein the cross-section of said distribution path is selected such that turbulent flow formed in the inlet region of the flowpath is minimized.

4. A non-membrane electrolytic cell according to claim 3, wherein side walls defining the cross-section of said distribution path are inclined toward the inlet of the flowpath.

* * * * *